United States Patent [19]

Olsson

[11] 4,452,529
[45] Jun. 5, 1984

[54] EXPOSURE AND PRINTING EASEL, ESPECIALLY FOR DYE TRANSFER PRINTING

[76] Inventor: John A. G. Olsson, c/o John Kousi, Fairfield & Maxwell, 277 Park Ave., New York, N.Y.

[21] Appl. No.: 384,484

[22] Filed: Jun. 3, 1982

Related U.S. Application Data

[63] Continuation of Ser. No. 177,226, Aug. 11, 1980, abandoned.

[51] Int. Cl.³ .............................................. G03B 27/58
[52] U.S. Cl. ......................................... 355/72; 355/73
[58] Field of Search ....................... 355/32, 72, 73, 74

[56] References Cited

U.S. PATENT DOCUMENTS

| | | | |
|---|---|---|---|
| 2,219,703 | 10/1940 | Spencer | 355/71 |
| 2,605,675 | 8/1952 | Morefield | 355/74 |
| 2,915,941 | 12/1959 | Finberg | 355/72 |
| 3,124,997 | 3/1964 | Morton | 355/74 |
| 3,237,543 | 3/1966 | Hoffman | 355/73 |
| 3,418,049 | 12/1968 | Whitlatch | 355/74 |
| 3,421,817 | 1/1969 | Schwardt | 355/74 |
| 3,728,021 | 4/1973 | Retzyl et al. | 355/74 |
| 3,829,211 | 8/1974 | Mitchell | 355/74 |
| 4,003,654 | 1/1977 | Smollen | 355/74 |
| 4,095,892 | 6/1978 | Thornton | 355/74 |
| 4,108,548 | 8/1978 | Hawkins | 355/74 |
| 4,257,702 | 3/1981 | Miller | 355/32 |

*Primary Examiner*—Monroe H. Hayes
*Attorney, Agent, or Firm*—Mandeville and Schweitzer

[57] ABSTRACT

The disclosure is directed to a photographic printing easel adapted especially for use in connection with the preparation of dye transfer color separations, to the end that the use of the dye transfer process is rendered significantly more convenient and expeditions. The easel includes a test board on one side and an exposure board on the other, with provisions for assuring a common plane of reference on opposite sides. On the test board side, the easel includes a plurality of filter openings through which a series of color test exposures is made in sequence, enabling the final color separation exposures to be properly carried out. Inasmuch as the test exposures for the dye transfer process must be carried out in total darkness, without benefit of any kind of darkroom light, the easel assembly is constructed to accommodate convenient and accurate performance of a series of color separation test exposures in sequence under conditions of total darkness.

8 Claims, 7 Drawing Figures

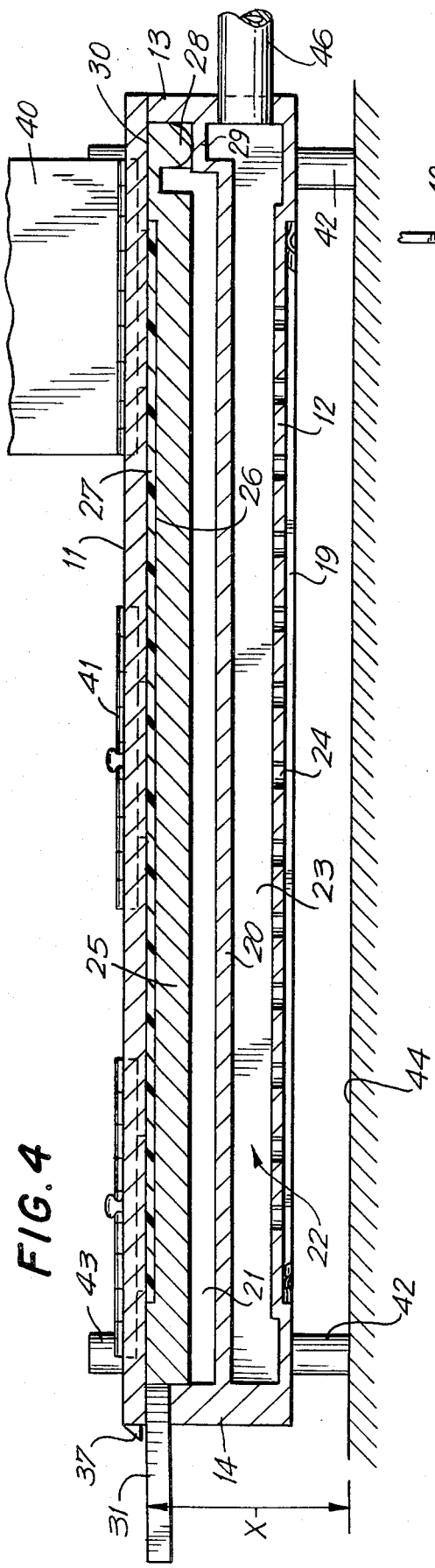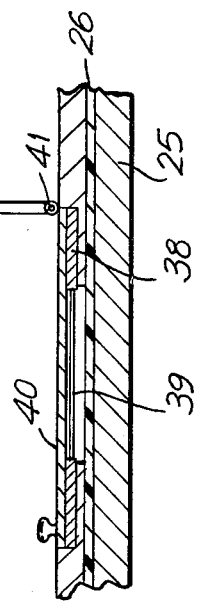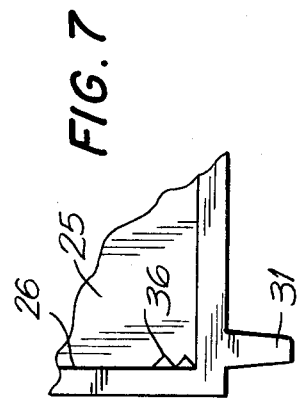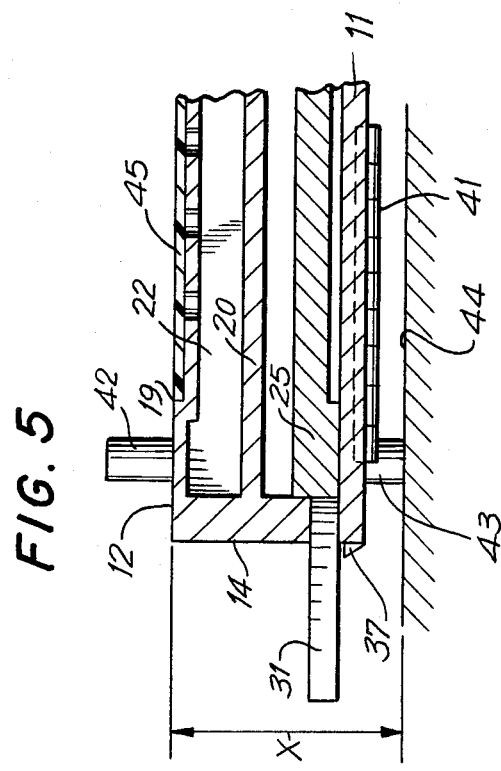

EXPOSURE AND PRINTING EASEL, ESPECIALLY FOR DYE TRANSFER PRINTING

This is a continuation of application Ser. No. 177,226, filed Aug. 11, 1980, now abandoned.

BACKGROUND AND SUMMARY OF INVENTION

One of the fundamental shortcomings of standard color photography systems is the relative nonpermanence of the resulting color prints. Even with high quality components, the life of the print is measurable in a rather finite number of years. Dye transfer techniques, on the other hand, are known and available which enable the truly permanent preservation of color photography reproductions. The dye transfer process involves the initial preparation of color separation plates, which are utilized in the preparation of the final color reproduction by means of printing procedures. The color separation plates themselves have great permanence and, for all practical purposes, may be preserved indefinitely (e.g. hundreds of years) and reused from time to time as desired.

As a practical matter, the dye transfer process has not been widely used by either professional or amateur photographers, because of the complicated, inconvenient and time-consuming procedures required in the preparation of the color separation plates. For example, prior to making of the color separation exposures, it is necessary to perform a series of test exposures, with varying exposure times, for each of three color separation filters. From these test results, performed with respect to each negative from which a dye transfer print is to be made, the photographer determines the optimum exposure time for each of the several filters, to be used in each of the several color separation exposures to be made. As will be readily apparent, this involves a succession of operations. Moreover, the exposures involved in the dye transfer procedures must be carried out in total darkness, without benefit of a subdued or filtered darkroom light of any kind. Accordingly, not only are the required operations large in number, but they are somewhat inconvenient to carry out, requiring the photographer to work in total darkness, strictly by feel.

Because of the time involvements and inconveniences, the dye transfer process has been largely ignored, notwithstanding other significant advantages in the process, particularly to the serious professional photographer.

In accordance with the invention, a novel and advantageous form of test exposure and printing easel is provided which greatly simplifies and expedites the necessary operations involved in the preparation of color separation plates for the dye transfer process, rendering the process significantly more attractive to use. The apparatus of the invention comprises a two-sided, reversible easel assembly which in one orientation serves as a test board, enabling a succession of exposures, with each of a plurality of different color separation filters, to be carried out rapidly, conveniently, and accurately under conditions of total darkness. In its reversed orientation, the easel assembly of the invention provides a support and reference plane for carrying out the final color separation exposures.

For a more complete understanding of the above and other features and advantages of the invention, reference should be made to the following detailed description of a preferred embodiment and to the accompanying drawings.

DESCRIPTION OF THE DRAWINGS

FIG. 4 is an enlarged cross sectional view as taken generally on line 4—4 of FIG. 1.

FIG. 5 is an enlarged, fragmentary cross sectional view similar to FIG. 4 but illustrating the apparatus in a reversed orientation for the making of a color separation exposure.

FIG. 6 is an enlarged, fragmentary cross sectional view illustrating one of the openings for making test exposures.

FIG. 7 is a fragmentary plan view of a movable film holder, illustrating means for properly orienting the film plate for test exposure.

DESCRIPTION OF A PREFERRED EMBODIMENT

Figure 1:
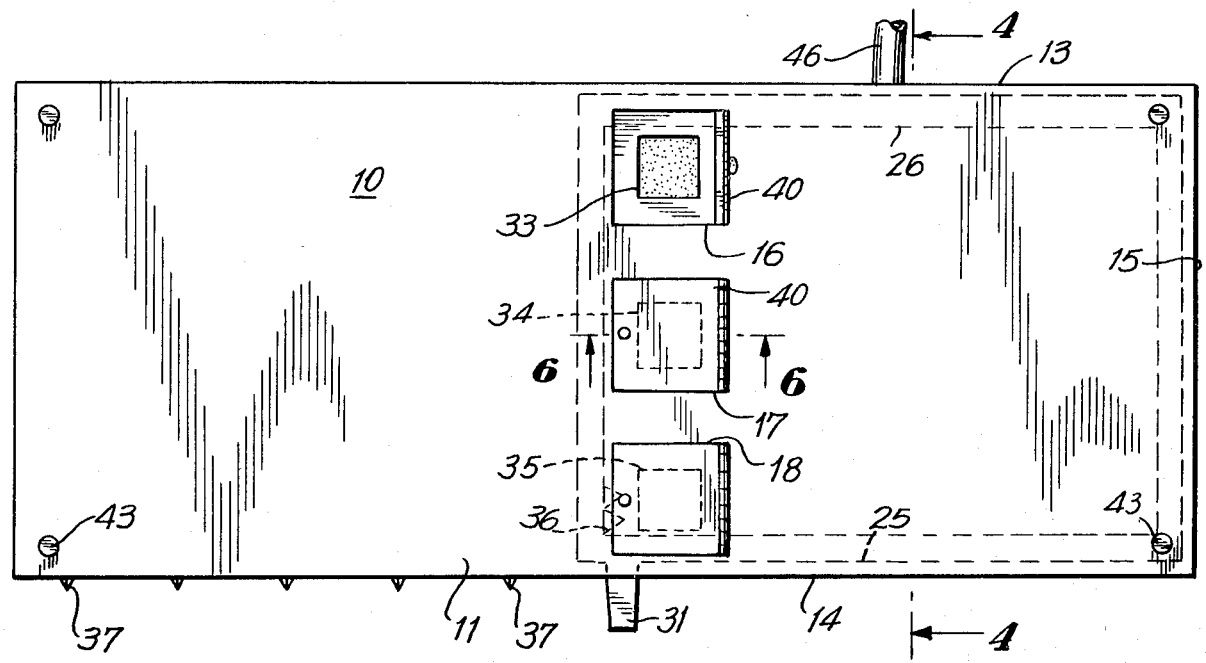
FIG. 1 is a top plan view of a reversible printing easel according to the invention, particularly for use in connection with dye transfer processes, illustrating the test board side of the easel.

Referring now to the drawings, the reference numeral 10 designates generally an easel housing according to the invention. The housing includes upper and lower panels 11, 12 joined by longitudinally extending front and back wall panels 13, 14 and an end wall panel 15 at one end. It will be understood of course that the terms upper and lower are used only in a relative sense herein, as the easel assembly as a whole is reversible and has no primary orientation. Typically and desirably, the easel assembly 10 may be formed of lightweight, inexpensive plastic moldings, although the materials of construction are not significant to the invention.

The upper panel 11 is of flat, rectangular form and closes the entire upper surface of the easel housing, with the exception of three test exposure recesses 16, 17, 18, which are spaced across the width of the panel. As will be more fully described, and as is apparent in FIG. 1, the overall width of the upper panel 10 is somewhat greater than the width of a sheet of photographic material to be exposed, and the overall length of the cover panel is approximately twice the length of the photographic sheet to be accommodated.

The bottom wall panel 12 is of the same size and rectangular shape as the upper panel 11 and is provided with a recessed area 19, to be described, for the reception of a sheet of photographic material for a color separation exposure.

As reflected in FIG. 4, the opposite sidewalls 13, 14 are connected internally by a dividing panel 20, which divides the easel assembly internally to form upper and lower chambers 21, 22. The lower chamber 22 is closed at one end by the end wall 15 and the opposite end by a partial end wall 23, so that the chamber 22 is fully enclosed except for small openings 24, provided in the recess area 19 of the bottom wall panel 12.

Slideably received within the upper chamber 21 of the assembly is a matrix film holder 25. The film holder 25 is of rectangular configuration, of a length and width slightly greater than the size of the film sheet to be accommodated, and it is provided with a shallow recess 26 in its upper surface for the reception of a photographic sheet 27.

Figure 2:
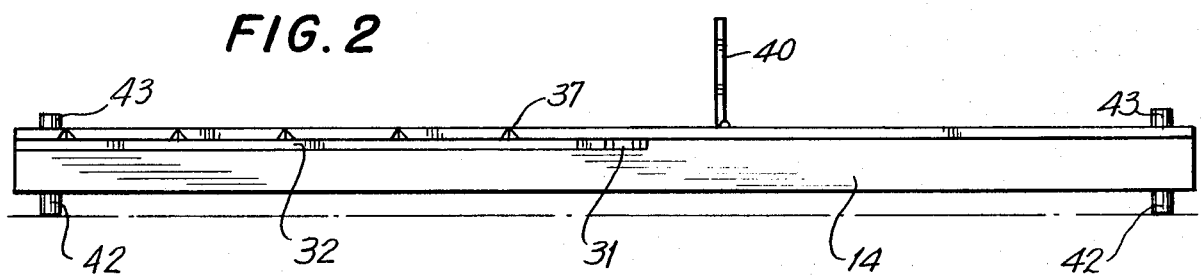
FIG. 2 is a front elevational view of the easel of FIG. 1.
Figure 3:
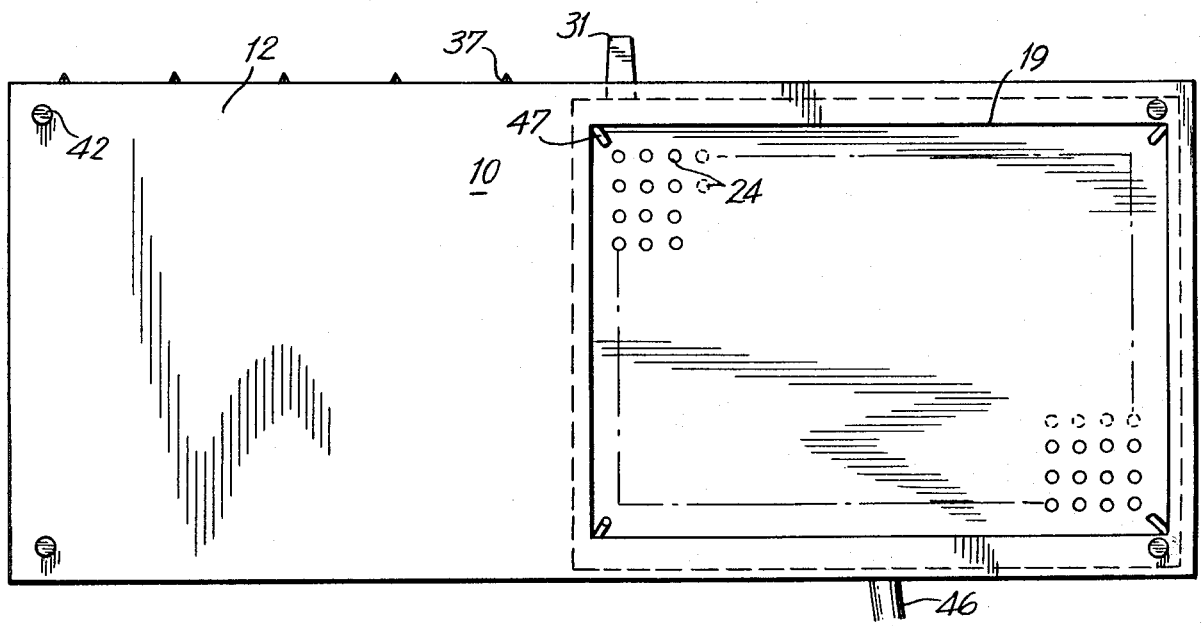
FIG. 3 is a plan view of the reverse side of the easel apparatus of FIG. 1.

At one side, the film holder 25 has a longitudinally extending slide element 28, which is slideably supported on a longitudinally extending shoulder 29 forming part of the dividing panel 20. The slide element 28 and shoulder 29 cooperatively serve to slideably support the film holder close against the lower surface 30 of the easel top panel 11. At its opposite (front) side, the film holder is supported by means of a forwardly projecting positioning element 31, which projects through the front wall 14 and moves freely in an elongated slot 32. As reflected in FIG. 2, the slot 32 is opened at one end (left end in FIG. 2) and extends more or less halfway along the front wall 14 a distance sufficient to accommodate the manual positioning element 31 in any operative position of the film holder 25.

As reflected in FIG. 1, the film holder 25 may be slideably inserted into the easel assembly to a limit position in which the film holder abuts the closed end wall 15 of the assembly. The several test exposure recesses 16-18 provided in the upper panel 11 are, in this position of the film holder plate, located near the left-hand edge margin of the film holding recess 26, such that end margin areas of the film sheet can be exposed through openings 33-35 in the respective exposure recesses 16-18.

Referring now to FIG. 7, the film holder 25 is provided in one corner of its film-receiving recess 26 with a pair of triangular projections 36 which match corresponding triangular indentations provided in the test film sheet. This assures that the photographer, when working in total darkness, can insert the test film sheet into the holder 25 only in the proper sheet orientation, with the proper surface facing up for exposure.

At several uniformly spaced locations along the length of the guide slot 32, there are provided small, outwardly projecting index elements 37. These index elements are of a size, shape and location such that, when the positioning element 31 is manually gripped and moved to the left from the position shown in FIG. 1, the operator's hand or finger will engage the index projections 37 in sequence, enabling the operator to determine, purely by feel and in total darkness, successive index positions for the film holder 25. The several indexing positions will of course correspond to successive exposure positions of the film sheet under the exposure openings 33-35.

As reflected particularly in FIG. 6, the exposure recesses 16-18 are arranged to receive filter holders 38 mounting filters 39 of a selected color, being red, green and blue for normal dye transfer procedures. A rectangular cover 40 is hinged to the upper panel 11 at 41, at each of the exposure recesses 16-18 and is arranged to be selectively openable to provide access to the related exposure openings 33-35.

In the use of the test board side of the easel assembly, the assembly is initially positioned under the enlarger. The selected negative is placed in the enlarger, and proper sizing and focusing is established using the bottom of the film holder 25 as a plane of reference. The operator then selects for the test exposures an area of the image which is largely neutral gray or white, and the easel is manipulated so that the desired exposure opening, say the opening 33, is located under that portion of the image. The balance of the operation is completed in total darkness.

First, the film holder 25 is removed from the device and loaded with a sheet of matrix film on which the test will be carried out. The matrix film, as mentioned, is appropriately notched on one corner, so that the loading operation is performed properly, with the correct side of the film facing upward, purely by feel. The loaded film holder 25 is then inserted into the open end of the upper chamber 21 and slid to the right until it reaches a limit position, as shown in FIG. 1. With two of the exposure lids closed, and one open, as shown, a timed exposure is taken through the exposure opening 31. The operator then grips the positioning element 31 and moves it to the left until he feels the first locating element 37. A second exposure, at a controllably different exposure interval, is then taken through the same aperture 33. The positioning element 31 is then again gripped and moved to the next locating projection 37, and another exposure is made at still another exposure interval. This sequence of operations continues until the full sequence of exposures (six in the form of the apparatus specifically illustrated) has been completed, each at a different exposure time.

It should be understood, of course, that the easel apparatus remains fixed in position during a given sequence of exposures through a single exposure opening. To this end, the easel apparatus 10 is supported during the test exposures on four spacer legs 42, which are provided with high friction surfacing elements or suction cup elements (not shown) at their ends, so that the device tends to remain fixed in position once it is set.

After a first sequence of exposures has been taken, the then open lid is closed and the film holder 25 is returned to its limit position as shown in FIG. 1. The easel is then relocated so that the test area of the negative is now aligned with the next exposure recess 17, after which, in total darkness, the lid 40 for that recess is opened. A succession of test exposures at different exposure intervals is then taken, this time using a different color filter as for a second color separation. Thereafter, the sequence of operations is repeated again for the third exposure opening, with a filter of a third color.

After completion of the entire sequence of exposures, the matrix film is removed and developed. The photographer then examines the developed matrix film and notes for further reference the optimum exposure interval for each of the different color separations. These optimum exposure intervals are applicable to the particular negative in the enlarger and to the particular type of film being employed.

After noting the optimum intervals for each of the color separations, the easel apparatus is turned upside down, then being supported on spacer legs 43 with the "bottom" panel 12 now facing upward. The easel is positioned so that the film recess 19 is properly located under the image area. Refocusing of the enlarger is made unnecessary by properly dimensioning the respective upper and lower spacer legs 43, 42. Thus, with reference to FIGS. 4 and 5, the distance X, from the supporting surface 44 to the surface of the matrix test film in FIG. 4 is, by proper proportioning of the legs 42, 43, made exactly equal to the distance from the supporting surface 44 to the surface of the film sheet 45 used in the final exposure. Accordingly, when the device is turned over, the exposure plane remains exactly the same.

To advantage, the film recess 19 is of a size and shape to closely receive a full sheet of photographic paper and to confine its edges. The multitude of openings 24 communicates with the interior of the easel chamber 23, which in turn communicates through tubing 46 with a vacuum device (not shown) of any suitble type. When the film sheet is positioned in the recess, the chamber 23 is evacuated, which serves to hold the sheet tight against the bottom of the recess area 19 and thus flat across its entire area. It will be understood, in this respect, that the apertures 24 are shown for purposes of illustration as being considerably larger than would be desired in actual practice. Alternatively, or even in addition to the vacuum apertures 24, corner clips 47 or the like may be provided for holding the exposure film flat.

As will be appreciated, a series of three color separation exposures is performed while the easel apparatus 10 remains fixed in position. For each color separation exposure, a selected filter is used, and the exposure interval for that filter is determined with reference to the series of test exposures just previously made. The three color separation exposures are utilized in accordance with known techniques, having nothing to do with the present invention, in the preparation of printing plates from which color reproductions of the original photograph may be made by printing processes.

The apparatus of the invention, although relatively simple and inexpensive in construction, vastly simplifies and expedites the inherently cumbersome procedures which the artist-photographer necessarily must follow in achieving quality reproductions through the dye transfer process. Through the use of the apparatus of the invention, the dye transfer process is made to be a realistic and practical process for the professional photographer and for serious amateur photographers, whereas heretofore the time consumed and the inconveniences suffered have virtually eliminated the dye transfer process from practical utilization by the great majority of photographers who might otherwise desire to enjoy its advantageous characteristics.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A photographic exposure easel apparatus, particularly for use in connection with the preparation of color separation plates for dye transfer color printing, which comprises
  (a) an easel housing including an opaque cover panel,
  (b) longitudinally extending guide means underneath the cover panel,
  (c) a matrix film holder slideable longitudinally on said guide means,
  (d) said matrix film holder having a recess in its upper surface positioned directly underneath said opaque cover panel,
  (e) three transversely spaced exposure openings in said opaque cover, each adapted to receive a separate color filter,
  (f) a selectively operable opaque cover lid for each of said exposure openings, arranged for one-at-a-time opening to provide access to a selected exposure opening,
  (g) manually engageable positioning means on said matrix film holder enabling said holder to be moved manually from one exposure position to another,
  (h) manually detectable index means associated with said positioning means to enable predetermined incremental indexing of said matrix film holder in total darkness,
  (i) first spacer means supporting said easel housing to maintain said matrix film, when in said holder, at a predetermined elevation above a support surface,
  (j) film support means on the opposite side of said easel housing from said opaque cover panel for supporting a color separation film sheet when said housing is in an inverted position, and
  (k) second spacer means associated with the opaque cover side of said housing operative, when said housing is inverted, to support said color separation film sheet at the same predetermined elevation above said support surface.

2. The photographic exposure easel of claim 1, further characterized by
  (a) said housing comprising upper and lower cover panels and an intermediate panel dividing said housing into upper and lower chambers,
  (b) said matrix film holder being slideably received in one of said chambers, adjacent said opaque cover panel,
  (c) vacuum passage means connected to the other of said chambers,
  (d) said film support means having a large plurality of openings communicating with said other chamber and providing a vacuum hold-down for said color separation film sheet.

3. The photographic exposure easel of claim 2, further characterized by
  (a) said easel housing being of at least slightly greater width than that of the film to be accommodated and approximately twice the length of such film.

4. The photographic exposure easel of claim 1, further characterized by
  (a) said easel housing having front and back walls,
  (b) said manually engageable positioning means comprising a forwardly projecting finger-like element,
  (c) the front wall of said easel housing having a longitudinally extending slot slideably receiving said finger-like element.

5. The photographic exposure easel of claim 4, further characterized by
  (a) said manually detectable means comprising means forming periodic discontinuities in the housing contours in the vicinity of said slot.

6. A photographic printing easel, especially suited for testing the optimum time for exposing dye transfer color separation plates to the image of a negative projected by an enlarger, which comprises
  (a) a base,
  (b) a film holder slideably receivable within said base,
  (c) index means for locating the film holder plate at appropriate intervals for test exposures,
  (d) said index means being spacedly distributed along the length of the base generally parallel to the axis of movement of the film holder plate,
  (e) an exposure window on the test side of said base,
  (f) said window occupying a portion of an area upon which said enlarger image is to be projected,
  (g) said window having a filter,
  (h) an exposure board for making a final color separation exposure on the side of the base opposite the test side, (i) holding means for temporarily holding the color separation film on the surface of the exposure board,
(j) spacer legs associated with said base,
(k) said base being positioned with respect to said spacer legs such that when the exposure board faces the enlarger, the exposure board is the same distance from the enlarger as the matrix film in the film holder plate is from the enlarger when the test side faces the enlarger.

7. The photographic printing easel according to claim 6, further characterized in that
 (a) three exposure windows are used having red, green and blue filters, respectively,
 (b) said exposure windows each having an opaque removable cover associated therewith.

8. The photographic exposure easel of claim 1, further comprising a filter in each of said three windows, said filters being green, blue and red, respectively.

* * * * *